United States Patent [19]

Mitsuya et al.

[11] 4,400,707
[45] Aug. 23, 1983

[54] RECORDING MEDIUM

[75] Inventors: Munehisa Mitsuya, Hachioji;
Motoyasu Terao, Hinodemachi;
Sakae Ota, Yokohama; Yoshio
Taniguchi, Hino; Toshimitsu Kaku,
Hachioji; Shinkichi Horigome,
Tachikawa, all of Japan

[73] Assignee: Hitachi, Ltd., Tokyo, Japan

[21] Appl. No.: 290,654

[22] Filed: Aug. 6, 1981

[30] Foreign Application Priority Data

Aug. 20, 1980 [JP] Japan ................................ 55-113510

[51] Int. Cl.$^3$ ............................................ G01D 15/34
[52] U.S. Cl. .................................. 346/135.1; 369/284
[58] Field of Search .......................... 346/135.1, 1.1;
369/288, 283, 284; 430/945

[56] References Cited

U.S. PATENT DOCUMENTS 4,237,468  12/1980  Nahara et al. ................ 346/135.1

Primary Examiner—Joseph W. Hartary
Assistant Examiner—Derek Jennings
Attorney, Agent, or Firm—Antonelli, Terry & Wands

[57] ABSTRACT

A recording medium in which a substrate, an inorganic material layer adapted to absorb light and generate heat, a first organic material layer made of an organic matter containing metal, and a second organic material layer adapted to be deformed or removed by heat are successively stacked. A metal salt of an organic acid, or organic metal compound etc. are employed for the first organic material layer. Owing to the presence of this layer, the recording medium exhibits a stability against changes in the ambient temperature.

20 Claims, 6 Drawing Figures

RECORDING MEDIUM

BACKGROUND OF THE INVENTION

This invention relates to a recording medium. More particularly, it relates to a recording medium which exploits the vaporization and removal, the deformation or the like of a recording thin film formed on a substrate as based on heat produced directly by projecting a recording beam such as laser beam onto the film or indirectly through auxiliary means.

As Japanese Laid-open Patent Application No. 55-126480, Japanese Laid-open Utility Model Registration Application No. 56-39270 and Japanese Utility Model Registration Application No. 55-1218, some of the inventors have previously proposed a recording medium wherein at least one layer of an inorganic material is directly overlaid with an organic material layer of low melting point or softening point as a recording film and wherein the inorganic material layer absorbs a recording beam, and heat produced at this time is used for deforming the organic material layer so as to perform recording. However, the recording film of such structure, especially one of high sensitivity has been found to have the disadvantage of being low in the degree of heat tolerance. That is, defects appear in the organic material layer due to a slight temperature change.

SUMMARY OF THE INVENTION

An object of this invention is to provide an improved recording medium whose performance is not degraded by a change in the ambient temperature.

This and other objects are accomplished by a recording medium characterized by comprising a substrate, an inorganic material layer which is formed on the substrate and which absorbs light to generate heat, a first organic material layer which is formed on the inorganic material layer and which is made of an organic matter containing metal, and a second organic material layer which is formed on the first organic material layer and which is deformed or removed by heat.

DETAILED DESCRIPTION OF THE PREFERRED EMBODIMENTS

Figure 1:
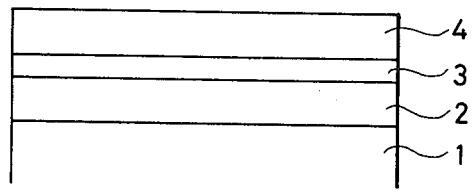
FIGS. 1, 2 and 3 are sectional views of an embodiment of a recording medium according to this invention.
Figure 2:
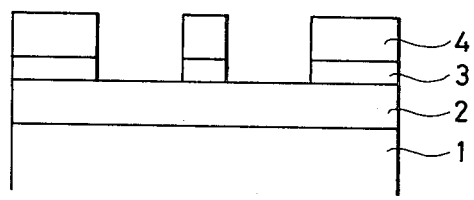
Figure 3:
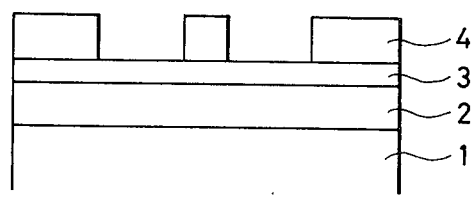

Fundamentally, the recording medium of this invention has a sectional structure as shown in FIG. 1. This recording medium is formed with an inorganic material layer 2, a first organic material layer 3 and a second organic material layer 4 on a predetermined substrate 1. A beam projected to the recording medium from the substrate side or the organic material layer side is absorbed by the inorganic material layer, and the organic material layer or layers is/are melted by heat produced at this time. In that case, although the power of the projected beam is also a factor, both the first and second organic material layers are usually melted in case where the melting point of the first organic material layer is low. The state at this time is illustrated in FIG. 2. Only the second organic material layer is melted in case where the melting point of the first organic material layer is high. The state at this time is illustrated in FIG. 3. The first organic material layer is thin, and hence, even when it is left behind, it hardly affects the reflection factor and accordingly the intensity of a reproduced signal. Although, in the above description, the deformation of the organic material layer has been expressed as being based on the melting, also the phenomenon of vaporization occurs in some cases.

The inorganic material layer may be made of any material as long as it absorbs light and generates heat and it is stable. In this regard, however, a semiconductor laser device has been employed as a recording beam source of such recording medium in recent years. It is therefore favorable to employ an inorganic material which is represented by a general formula of $A_xB_y$ (where letter A denotes at least one element selected from the group consisting of In, Bi, Te, Sb, Pb, Ge and Sn, letter B denotes at least one element selected from the group consisting of S, Se and O, and letters x and y denote values in ranges of $65 \leq x \leq 100$ and $0 \leq y \leq 35$ in terms of the atomic percent) as described in the specification of Japanese Laid-open Patent Application No. 55-126480 and which is a material satisfactorily playing the role with respect to a laser beam. As the thickness of the inorganic material layer, a range of 20-300 nm is preferable, and a range of 30-60 nm is more preferable. When the thickness is too small, a predetermined sufficient effect does not appear. On the other hand, when it is unnecessarily great, the conduction of heat in the lateral direction increases to lower the sensitivity.

Further, the recording medium of this invention is preferably provided with a second inorganic material layer on the aforecited inorganic material layer or between it and the first organic material layer, the second inorganic material layer being made of an inorganic material which is represented by a general formula of $D_sE_t$ (where letter D denotes at least one element selected from the group consisting of In, Bi, Te, Sb, Pb, Ge and Sn, letter E denote at least one element selected from the group consisting of S, Se and O, and letters s and t denote values in ranges of $25 \leq s \leq 60$ and $40 \leq t \leq 75$ in terms of the atomic percent).

The first function of the second inorganic material layer is that, by setting a difference in the material composition between the first inorganic material layer and this second inorganic material layer, the surface of the first inorganic material layer is prevented from melting or oxidizing. The second function is to realize a great reproduced signal in case of reading out a recorded information. Such functions of the second inorganic material layer are described in detail in the specification of Japanese Laid-open Patent Application No. 55-126480. As the thickness of the second inorganic material layer, a range of 10-300 nm is preferable, and a range of 15-40 nm is more preferable. The ranges have been specified for the same reasons as those for the specification of the thickness of the first inorganic material layer.

When the materials of the above-mentioned formulas are employed for the first and second inorganic material layers, they are a combination of the same kind of materials having unequal percents. With the percents of the compositions, the characteristics of the respective layers can be enhanced. For example, when the first inorganic material layer is made of the material of the general formula $A_xB_y$, the absorption of light can be increased. On the other hand, a high thermal conductivity lowers the sensitivity, and hence, the material is determined so that the thermal conductivity may become below approximately 1 W/cm·degree at the normal temperature.

However, the inorganic material layer of this invention is not restricted to the aforecited composition. As inorganic matters which generate heat when subjected to the projection of the recording beam, a large number of materials including CdS, CdSe etc. have heretofore been known, and these can also be employed. However, they are inferior in the recording sensitivity to the composition represented by the aforecited general formula.

Preferably, the first organic material layer contains at least one metal selected from the group consisting of Li, Na, K, Rb, Cs, Cu, Ag, Au, Be, Mg, Ca, Sr, Ba, Zn, Cd, Hg, B, Al, Ga, Ge, Sn, Pb, Co, Fe, Ni, Cr, Ti and Mn. As examples of such materials, there are metal salts of organic acids. They are the metal salts of carboxylic acids such as capric acid, lauric acid, palmitic acid, stearic acid and phthalic acid; sulfonic acids such as methanesulfonic acid, benzenesulfonic acid, p-toluenesulfonic acid and 1-naphthalenesulfonic acid; sulfinic acids such as benzenesulfinic acid and p-toluenesulfinic acid; and organic acids in a broad sense such as phenol, enol and thiophenol.

Secondly, alkoxides such as, for example, aluminumalkoxide and calciumalkoxide are employed.

Thirdly, organometal compounds such as, for example, bisbenzenechromium and alkyltitanium compounds are employed.

Among these materials, the metal salts of the organic acids are the most preferable because of their high stabilities.

It is desirable that the material to construct the first organic material layer has a melting point or a softening point of 60° C. to 400° C.

As the thickness of the first organic material layer, a value of 1–50 nm is preferable, and a value of 2–10 nm is especially preferable.

With only the first organic material layer, no recording film is formed. The reasons are that when the material of the first organic material layer is made a thickness of at least 20 nm required for the recording film, a smooth film cannot be obtained, and that when the first organic material layer is not overlaid with the second organic material layer, defects are liable to develop in the film.

For the second organic material layer, the following compounds are employed.

They are hydrocarbons, for example, octacosane, dotriacontane, hexatriacontane and hexaethylbenzen; halogenides of hydrocarbons, for example, melissylchloride and 1,2-diiodoethylene; alcohols, for example, cerotyl alcohol and tripropynylcarbinol; esters of alcohols, for example, melissic acid methylester; aldehydes, for example, metapropionaldehyde; ketones, for example, palmitone, stearone and β-phenylbutyrophenone; nitro or nitroso compounds, for example, 2,2-dinitro-1,3-propanediol; amino compounds, for example, dodecamethylenediamine; carboxylic acids, for example, stearic acid, behenic acid, sorbic acid, cyclobutane-1,1-dicarboxylic acid and benzoic acid; spiro compounds, for example, anthrone-9-spiro-1'-cyclopropane; heterocyclic compounds, for example, furan derivatives and carbazoles; natural resins, for example, natural rubber, cellulose and cellulose derivatives; synthetic resins, for example, polyethylene, ethylene-vinylacetate copolymer, polypropylene, polyvinyl chloride, polyvinylidene chloride, polyvinyl acetate, polyvinyl acetal, fluorocarbon plastics, acrylic resin, polyacrylonitrile, polystyrene, polyacetal resin and styrene-acrylonitrile copolymer; etc.

Among these organic materials, one whose melting point, softening point or sublimation point is at least 60° C.—at most 200° C. is preferable, and one whose melting point, softening point or sublimation point is at least 70° C.—at most 150° C. is especially preferable.

As the thickness of the second organic material layer, a range of 20–200 nm is preferable, and a range of 30–100 nm is especially preferable. When the layer is too thin, the intensity of a reproduced signal becomes low, and when it is too thick, the shapes of pits or recesses are disordered, and the error rate of read-out increases (the S/N (signal-to-noise) ratio decreases).

Preferably, a glass plate, a transparent plastic plate or the like is employed as the substrate. It is also possible to employ a metal substrate of aluminum or the like whose surface is coated with a plastic or the like being a thermally insulating substance. In this case, however, the recording beam can be projected only from the second organic material layer side.

The method of manufacturing the inorganic material layer is sputtering, electron-beam evaporation, vacuum evaporation, or the like. When the second inorganic material layer is employed, the same applies to the manufacture thereof.

As the method of forming the organic substance film, there can be employed coating at a high temperature, spin coating, vacuum evaporation, sputtering, glow discharge, a method in which a monomer or a substance of low molecular weight is hardened by electron-beam irradiation, ultraviolet-ray irradiation or heating during or after the evaporation thereof, or the like. The absorption of light may well be increased by co-evaporation with an inorganic matter or by simultaneous rotating-evaporation.

It is also effective for enhancing the sensitivity that the molecular weight is lowered by electron-beam irradiation, ultraviolet-ray irradiation or the like after the organic substance film has been formed. Further, the first organic material layer may well be formed by the process for manufacturing a built-up film. When the substrate is provided with a guide groove, it is favorable to employ the evaporation process, the plasma polymerization process or the like.

In case where the melting point of the first organic material layer is low, it is also effective for increasing the intensity of the reproduced signal that the material composition is gradually changed between the first organic material layer and the second organic material layer. This measure can be realized by, for example, a method in which a substance to form the first organic material layer is vacuum-evaporated, subsequently both this material and a material to form the second organic material layer are vacuum-evaporated, and lastly only the material to form the second organic layer is vacuum-evaporated.

It is effective for enhancing the stability against heat that the second organic material layer is overlaid with a third organic material layer higher in the melting point than the former. Preferable as the material of the third organic material layer is an organic polymer whose melting point is higher than that of the second organic material layer as described above. For example, polymethylmethacrylate, polyethylene or the like is employed. It is preferable that the thickness of the third organic material layer is at least 1 nm and falls within a range not greater than the thickness of the second organic material layer.

EXAMPLE 1

Chemically-reinforced glass in the shape of a disc having a diameter of 31 cm and a thickness of 1.1 mm was rotated about its axis at a rotational frequency of 120 rpm. On the disc, Bi was evaporated to a film thickness of 50 nm, and $Sb_2S_3$ was subsequently evaporated to a film thickness of 30 nm. The reflection factor of the resultant film for the light of a semiconductor laser wavelength (830 nm) was 72%. On the film, zinc stearate (melting point: 140° C.) was evaporated to a film thickness of 5 nm. The reflection factor at this time was 69.5%. On the resultant film, $n-C_{36}H_{74}$ (melting point: 76° C.) was further evaporated to a film thickness of 50 nm. Then, a recording film was finished up. The reflection factor of this film was 24%. Also a recording film which was identical to the above recording film except that the zinc stearate layer was not formed, was fabricated by the same method.

While each of the two kinds of recording media was rotating at a rotational frequency of 240 rpm, recording and reproduction were carried out with a semiconductor laser. The semiconductor laser had the wavelength of 830 nm and a maximum output of 15 mW, and the light was focused so that a spot diameter on the disc might become about 1 μm. The recording was carried out at a pulse width of 30–300 ns.

Figure 4:
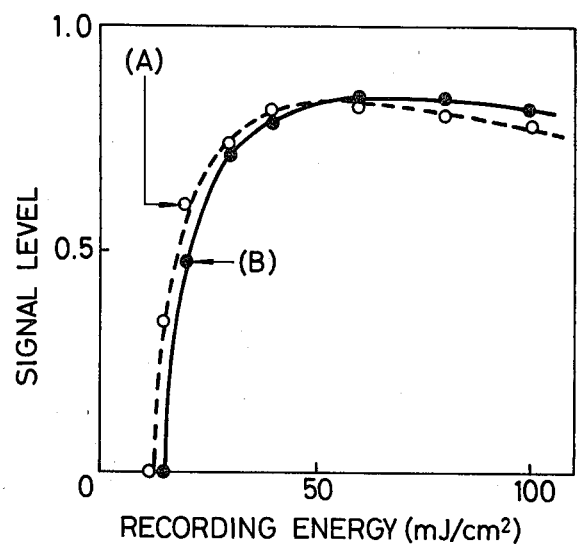
FIG. 4 is a graph illustrative of recording energy characteristics.

The relationships between the recording energy and the reproduced signal level at a pulse width of 50 ns are illustrated in FIG. 4. Curve B corresponds to the medium having the zinc stearate layer, while curve A corresponds to the medium not having it.

Figure 5:
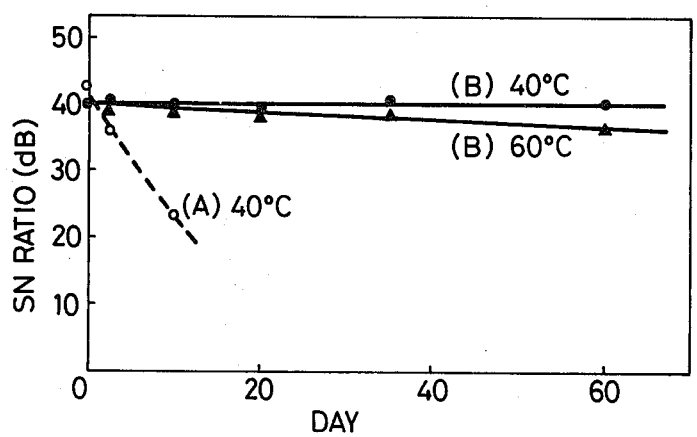
FIGS. 5 and 6 are graphs illustrative of the variations of the S/N (signal-to-noise) ratio versus time.

Each of the recording members having been written was let stand in a constant-temperature oven at 40° C. and at 60° C., and the variations of the S/N ratios versus time were measured. The results are illustrated in FIG. 5. In the absence of the zinc stearate, the S/N ratio decreases conspicuously in one day in the case of 60° C. and lowers as indicated by curve A even in the case of 40° C. In the presence of the zinc stearate, the decrease rate of the S/N ratio is within 10% even after 60 days in the case of 60° C. and is very small in the case of 40° C. as illustrated by curve B in the graph. Accordingly, the increase rate of the error rate is small.

EXAMPLE 2

Figure 6:
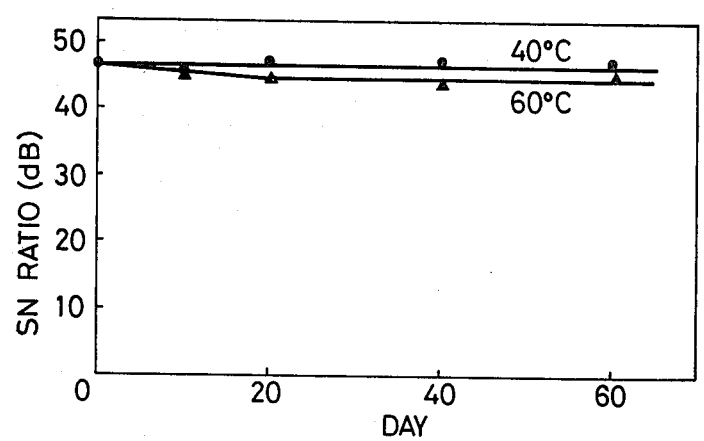

Quite the same experiment as Example 1 was carried out except that, instead of the zinc stearate, silver stearate (melting point: 205° C.) was evaporated to a film thickness of 5 nm. The results are illustrated in FIG. 6. The same tendencies as in Example 1 are observed, and as a whole, the S/N ratio is higher than in Example 1.

Similar effects appear even when the Mg salt, Ca salt and Pb salt of stearic acid or caprylic acid, the Zn salt of alkylbenzenesulfonic acid, and calcium alcoxide are used.

What is claimed is:

1. A recording medium comprising a substrate, an inorganic material layer which is formed on said substrate and which absorbs light and generates heat, a first organic material layer which is formed on said inorganic material layer and which is made of at least one metal-containing organic compound, and a second organic material layer which is formed on said first organic material layer and which is deformed or removed by heat.

2. A recording medium according to claim 1, wherein said first organic material layer is made of at least one organic material selected from the group consisting of a metal salt of an organic acid, an alkoxide, and an organic metal compound.

3. A recording medium according to claim 1, wherein said metal salt of said organic acid is at least one metal salt selected from the group consisting of metal salts of carboxylic acids, metal salts of sulfonic acids, metal salts of sulfinic acids, metal salts of phenol, metal salts of enol, and metal salts of thiophenol.

4. A recording medium according to claim 3, wherein a metal of said at least one metal salt is at least one metal selected from the group consisting of Li, Na, K, Rb, Cs, Cu, Ag, Au, Be, Mg, Ca, Sr, Ba, Zn, Cd, Hg, B, Al, Ga, Ge, Sn, Pb, Co, Fe, Ni, Cr, Ti and Mn.

5. A recording medium according to any of claims 1 to 4, wherein said first organic material layer is made of an organic material whose melting point or softening point lies in a range of 60°–400° C.

6. A recording medium according to any of claims 1 to 4, wherein said first organic material layer has a thickness lying in a range of 1–50 nm.

7. A recording medium according to claim 1, wherein said inorganic material layer is made of an inorganic material which is represented by a general formula of $A_xB_y$ (where letter A denotes at least one element selected from the group consisting of In, Bi, Te, Sb, Pb, Ge and Sn, letter B denotes at least one element selected from the group consisting of S, Se and O, letter x indicates a value in a range of $65 \leq x \leq 100$ in terms of atomic percent, and letter y indicates a value in a range of $0 \leq y \leq 35$ in terms of atomic percent).

8. A recording medium according to claim 7, wherein a thickness of said inorganic material layer lies in a range of 20–300 nm.

9. A recording medium according to claim 1, 2, 3, 4, 7 or 8, wherein said second organic material layer is made of an organic material whose melting point or softening point lies in a range of 60°–200° C.

10. A recording medium according to claim 9, wherein said second organic material layer is made of at least one material selected from the group consisting of hydrocarbon, a halogen derivative of hydrocarbon, alcohol, ester, aldehyde, ketone, a nitro compound, a nitroso compound, an amino compound, carboxylic acid, a spiro compound, a heterocyclic compound, a natural resin, and a synthetic resin.

11. A recording medium according to claim 9, wherein said second organic material layer has a thickness lying in a range of 20–200 nm.

12. A recording medium according to claim 7 or 8, wherein a second inorganic material layer is further formed between said inorganic material layer and said first organic material layer, said second inorganic material layer being made of a material which is represented by a general formula of $D_sE_t$ (where letter D denotes at least one element selected from the group consisting of In, Bi, Te, Sb, Pb, Ge and Sn, letter E denotes at least one element selected from the group consisting of S, Se and O, letter s indicates a value in a range of $25 \leq s \leq 60$ in terms of atomic percent, and letter t indicates a value in a range of $40 \leq t \leq 75$ in terms of atomic percent).

13. A recording medium according to claim 12, wherein said second inorganic material layer has a thickness lying in a range of 10–300 nm.

14. A recording medium according to claim 1, 2, 3, 4, 7 or 8, wherein a third organic material layer is further formed on said second organic material layer, said third organic material layer being made of an organic material which has a melting point or softening point higher than a melting point or softening point of the material forming said second organic material layer.

15. A recording medium according to claim 14, wherein said third organic material layer has a thickness lying in a range of at least 1 nm and not exceeding a thickness of said second organic material layer.

16. A recording medium according to claim 2, wherein said first organic material layer is made of at least one alkoxide, and wherein said alkoxide is selected from the group consisting of aluminumalkoxide and calciumalkoxide.

17. A recording medium according to claim 2, wherein said first organic material layer is made of at least one organic metal compound, and wherein said organic metal compound is selected from the group consisting of bisbenzenechromium and alkyltitanium compounds.

18. A recording medium according to claim 2, wherein said first organic material layer is made of at least one metal salt of an organic acid.

19. A recording medium according to claim 3 or 4, wherein the organic acid of said at least one metal salt of an organic acid is selected from the group consisting or capric acid, lauric acid, palmitic acid, stearic acid, phthalic acid, methanesulfonic acid, benzenesulfonic acid, p-toluenesulfonic acid, 1-naphthalenesulfonic acid, benzenesulfinic acid, p-toluenesulfinic acid, phenol and thiophenol.

20. A recording medium according to claim 10, wherein said second organic material layer is made of at least one material selected from the group consisting of octacosane, dotriacontane, hexatriacontane, hexaethylbenzene, melissylchloride, 1,2-diiodoethylene, cerotyl alcohol, tripropynylcarbinol, melissic acid methylester, metapropionaldehyde, palmitone, stearone, $\beta$-phenylbutyrophenone, 2,2-dinitro-3,3-propanediol, dodecamethylenediamine, stearic acid, behenic acid, sorbic acid, cyclobutane-1,1-dicarboxylic acid, benzoic acid, anthrone-9-spiro-1'-cyclopropane, furan derivatives, carbazoles, natural rubber, cellulose and derivatives thereof, polyethylene, ethylene-vinylacetate copolymer, polypropylene, polyvinyl chloride, polyvinylidene chloride, polyvinyl acetate, polyvinyl acetal, fluorocarbon plastics, acrylic resin, polyacrylonitrile, polystyrene, polyacetal resin and styrene-acrylonitrile copolymer.

* * * * *